United States Patent
Nilsson

(10) Patent No.: US 11,208,064 B2
(45) Date of Patent: Dec. 28, 2021

(54) CRASH BOX FOR A BUMPER

(71) Applicant: Gestamp Hardtech AB, Luleå (SE)

(72) Inventor: Johan Nilsson, Luleå (SE)

(73) Assignee: Gestamp Hardtech AB, Lulea (SE)

(*) Notice: Subject to any disclaimer, the term of this patent is extended or adjusted under 35 U.S.C. 154(b) by 29 days.

(21) Appl. No.: 16/954,775

(22) PCT Filed: Nov. 21, 2018

(86) PCT No.: PCT/EP2018/082051
§ 371 (c)(1),
(2) Date: Jun. 17, 2020

(87) PCT Pub. No.: WO2019/120840
PCT Pub. Date: Jun. 27, 2019

(65) Prior Publication Data
US 2021/0086711 A1  Mar. 25, 2021

(30) Foreign Application Priority Data

Dec. 18, 2017  (SE) .................... 1751561-0

(51) Int. Cl.
*B60J 7/00*  (2006.01)
*B60R 19/34*  (2006.01)
*B60R 19/18*  (2006.01)

(52) U.S. Cl.
CPC ............. *B60R 19/34* (2013.01); *B60R 19/18* (2013.01)

(58) Field of Classification Search
CPC ..... B60R 19/34; B60R 21/045; B23K 9/0953; G06F 3/0482; H04N 21/4622;
(Continued)

(56) References Cited

U.S. PATENT DOCUMENTS

| 6,814,381 | B1* | 11/2004 | Frank | ...................... B60R 19/34 293/120 |
| 7,678,208 | B2* | 3/2010 | Bodin | ...................... C21D 1/18 148/648 |

(Continued)

FOREIGN PATENT DOCUMENTS

DE  10 2004 041 476 A1  11/2005
DE  10 2008 045 515 A1  3/2010
(Continued)

*Primary Examiner* — Kiran B Patel
(74) *Attorney, Agent, or Firm* — Blank Rome LLP

(57) ABSTRACT

The invention relates to a crash box (3) comprising two generally U-shaped members (11, 12) having legs (11a, 12a) and provided at respective leg with at least two adjacent trigger means (13) and an intermediate portion (14) formed between said trigger means (13). The U-shaped members (11, 12) is welded together at areas along a trim edge (15) except for the trim edge (15) formed between respective legs of respective trigger means (13) so as to form a crash box (3) having aligned trigger means (13) and intermediate portion (14). The trigger means (13) are arranged normal to crash box (3), and the intermediate portion (14) of respective leg (11a, 12a) is welded together at the trim edge (15) thereof by a weld bead (20) having a length (L) which is longer that the shortest length (1) between two adjacent trigger means (13). The invention also relates to a method for producing such a crash box.

6 Claims, 2 Drawing Sheets

(58) Field of Classification Search
CPC ....... B29C 66/71; B62D 21/152; C08L 23/10; B29K 2023/00
See application file for complete search history.

(56) References Cited

U.S. PATENT DOCUMENTS

| | | | | |
|---|---|---|---|---|
| 9,387,883 B2* | 7/2016 | Hirota | .................. | B62D 21/152 |
| 9,701,267 B1* | 7/2017 | Ohmura | .................. | B60R 19/34 |
| 2001/0013706 A1* | 8/2001 | Artner | .................. | B60R 19/34 |
| | | | | 293/133 |
| 2002/0113447 A1* | 8/2002 | Frank | .................. | B60R 19/34 |
| | | | | 293/133 |
| 2002/0158384 A1* | 10/2002 | Beck | .................. | F16F 7/12 |
| | | | | 267/139 |
| 2003/0178801 A1* | 9/2003 | Wikstrom | .................. | B60R 19/34 |
| | | | | 293/133 |
| 2003/0218341 A1* | 11/2003 | Jonsson | .................. | B60R 19/34 |
| | | | | 293/102 |
| 2006/0066115 A1* | 3/2006 | Haneda | .................. | B60R 19/34 |
| | | | | 293/133 |
| 2008/0116719 A1* | 5/2008 | Bae | .................. | B60R 19/34 |
| | | | | 296/187.09 |
| 2009/0001737 A1 | 1/2009 | Salomonsson | | |
| 2009/0026777 A1* | 1/2009 | Schmid | .................. | B60R 19/34 |
| | | | | 293/133 |
| 2011/0187135 A1* | 8/2011 | Kano | .................. | B60R 19/34 |
| | | | | 293/133 |
| 2012/0025547 A1* | 2/2012 | Haneda | .................. | B60R 19/34 |
| | | | | 293/133 |
| 2014/0062106 A1* | 3/2014 | Han | .................. | B60R 19/34 |
| | | | | 293/133 |
| 2014/0062107 A1* | 3/2014 | Kim | .................. | B60R 19/34 |
| | | | | 293/133 |
| 2014/0354008 A1* | 12/2014 | Sakakibara | .................. | B60R 19/34 |
| | | | | 296/187.1 |
| 2015/0158442 A1* | 6/2015 | Yun | .................. | B60R 19/34 |
| | | | | 293/132 |
| 2015/0246651 A1* | 9/2015 | Muraji | .................. | B62D 21/152 |
| | | | | 296/187.1 |
| 2016/0039374 A1* | 2/2016 | Sugano | .................. | B62D 25/08 |
| | | | | 293/133 |
| 2016/0101751 A1* | 4/2016 | Bou | .................. | B62D 21/152 |
| | | | | 293/133 |
| 2016/0121934 A1* | 5/2016 | Murayama | .................. | B62D 25/082 |
| | | | | 296/187.09 |
| 2016/0144814 A1* | 5/2016 | Ahn | .................. | B23K 11/11 |
| | | | | 293/133 |
| 2016/0280165 A1* | 9/2016 | Kawanabe | .................. | B60R 19/18 |
| 2016/0356334 A1* | 12/2016 | Onoue | .................. | B62D 25/04 |
| 2017/0021868 A1* | 1/2017 | Watanabe | .................. | B62D 21/152 |
| 2017/0274851 A1* | 9/2017 | Schneider | .................. | B60R 19/24 |
| 2017/0320455 A1* | 11/2017 | Nakayama | .................. | B62D 21/152 |
| 2018/0162452 A1* | 6/2018 | Hirota | .................. | B62D 21/02 |
| 2018/0257586 A1* | 9/2018 | Kitakata | .................. | B60J 5/0484 |
| 2018/0281710 A1* | 10/2018 | Lindblom | .................. | B60R 19/44 |
| 2018/0281715 A1* | 10/2018 | Lu | .................. | F16F 7/12 |
| 2018/0334121 A1* | 11/2018 | Sabu | .................. | B62D 21/152 |
| 2019/0168700 A1* | 6/2019 | Lattorff | .................. | B60R 19/04 |
| 2019/0193657 A1* | 6/2019 | Fender | .................. | B60R 19/18 |
| 2019/0232904 A1* | 8/2019 | Kurogi | .................. | B60R 19/34 |
| 2019/0233014 A1* | 8/2019 | Tagaito | .................. | B60R 19/24 |
| 2019/0256020 A1* | 8/2019 | Tomomatsu | .................. | B60R 19/18 |
| 2019/0291668 A1* | 9/2019 | Sato | .................. | B60R 19/12 |
| 2019/0291670 A1* | 9/2019 | Toelle | .................. | B60R 19/34 |
| 2019/0291671 A1* | 9/2019 | Wada | .................. | B60R 19/26 |
| 2019/0351854 A1* | 11/2019 | Bae | .................. | B60R 19/18 |
| 2020/0324823 A1* | 10/2020 | Kawamura | .................. | B62D 21/08 |
| 2020/0384934 A1* | 12/2020 | Yotsuyanagi | .................. | B60R 19/34 |
| 2021/0162939 A1* | 6/2021 | Kawamura | .................. | B60R 19/34 |

FOREIGN PATENT DOCUMENTS

| | | |
|---|---|---|
| DE | 10 2015 223 190 A1 | 5/2017 |
| DE | 20 2017 101 524 U1 | 6/2017 |
| JP | 2000-81069 A | 3/2000 |
| WO | WO 2007/086787 A1 | 8/2007 |

* cited by examiner

CRASH BOX FOR A BUMPER

FIELD OF THE INVENTION

The invention relates to a crash box, and more particular to a crash box formed of at least two members welded together and arranged between a cross member and a vehicle, and to a method for producing such a crash box.

BACKGROUND OF THE INVENTION

Bumpers are typically mounted across the front and rear ends of a vehicle, preferably a motor vehicle, to absorb impact energy in the event of a crash. The bumper includes normally a cross member which is attached to the body in white of the motor vehicle via a crash box attached to the cross member near or at the respective end of the cross member. The cross member and the crash boxes are preferably made of steel.

The crash box is designed to absorb by buckling and plastic deformation at least some of the impact energy originating from a crash.

Known crash boxes are normally formed from two generally U-shaped members, one upper and one lower member, which are welded together at certain points by horizontally made welds along respective trim edge of the legs of the upper and lower members so as to form a longitudinal extending hollow body having a cross-section in the form of a quadrangle.

To initiate the buckling of the crash box to certain areas thereof in the event of a crash so called trigger means are formed at least at the vertical sides of the crash box. The trigger means are normally formed in the legs of the U-shaped member as one or more indentations arranged normal to the longitudinally/horizontally extending legs of respective U-shaped member, and the indentations of the upper leg are aligned with corresponding indentations in the lower leg and vice versa.

To control and improve the buckling behavior of the crash box the trigger means of respective U-shaped member are not welded together at their trim edges, and in case two or more trigger means are formed at each side of the crash box there will be an intermediate portion having a relatively short extension, as seen in the horizontal direction, i.e. it will be a relatively short distance between two adjacent trigger means, and the trim edges of the upper and lower legs of the intermediate portion are welded together.

However, since said distance between adjacent trigger means is relatively short, the weld bead so formed will have reduced strength, particularly at the ends of the weld bead.

Object of the Invention

An object of the invention is thus to increase the strength of the weld bead(s) formed for attaching the trim edges of the upper and lower members of the crash box to each other at an intermediate portion formed between two adjacent trigger means and to reduce possible crack formation of said weld bead(s) in the event of a crash.

BRIEF DESCRIPTION OF THE INVENTION

According to the invention this object is achieved by a crash box comprising two generally U-shaped members, one upper and one lower member, having legs and provided at respective leg with at least two adjacent trigger means and an intermediate portion formed between said trigger means, said upper and lower members being welded together at areas along a trim edge of respective legs of the U-shaped members except for the trim edge formed between respective legs of respective trigger means so as to form a longitudinal extending generally hollow crash box having a cross-section in the form of a quadrangle and having aligned trigger means and intermediate portion, said trigger means being arranged normal to said longitudinal extending crash box, wherein the intermediate portion of respective leg being welded together at the trim edge thereof by a weld bead, characterized in that said weld bead has a length which is longer that the shortest length between two adjacent trigger means.

The object is also achieved by a method for producing such a crash box.

Preferred embodiments are defined in the dependent claims.

BRIEF DESCRIPTION OF THE DRAWINGS

The invention is described in more detail below with reference being made to non-limiting examples shown on the appended drawings, in which.

DESCRIPTION OF PREFERRED EMBODIMENTS

In the below description and claims the bumper with attached crash boxes is described in relation to a front bumper. Therefore, expressions such as rear side, forward end, etc. should be read in connection with a front bumper but not limited to a front bumper.

Figure 1:
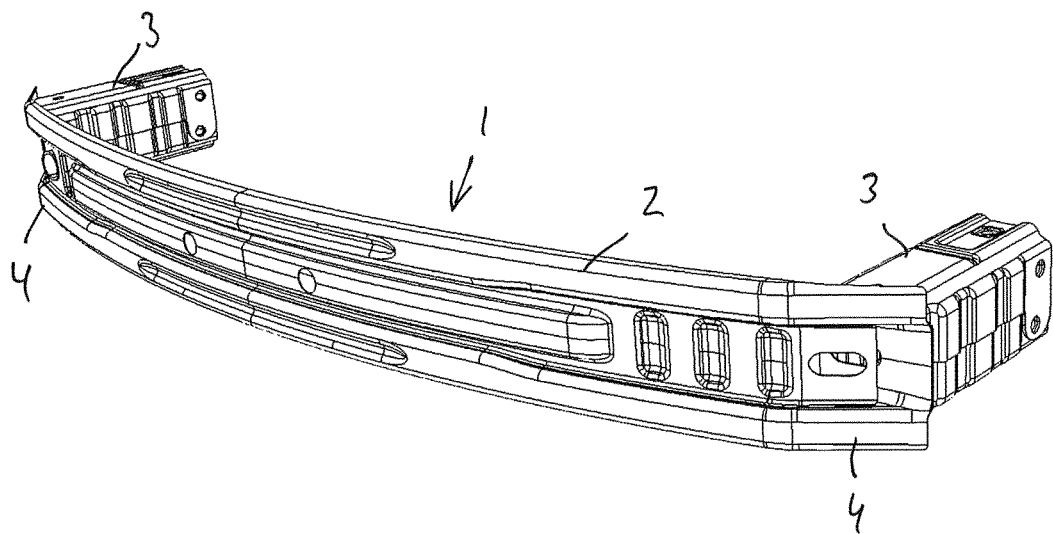
FIG. 1 is a perspective view obliquely from the front of an bumper having a crash box welded to the respective end of a cross member.
Figure 2:
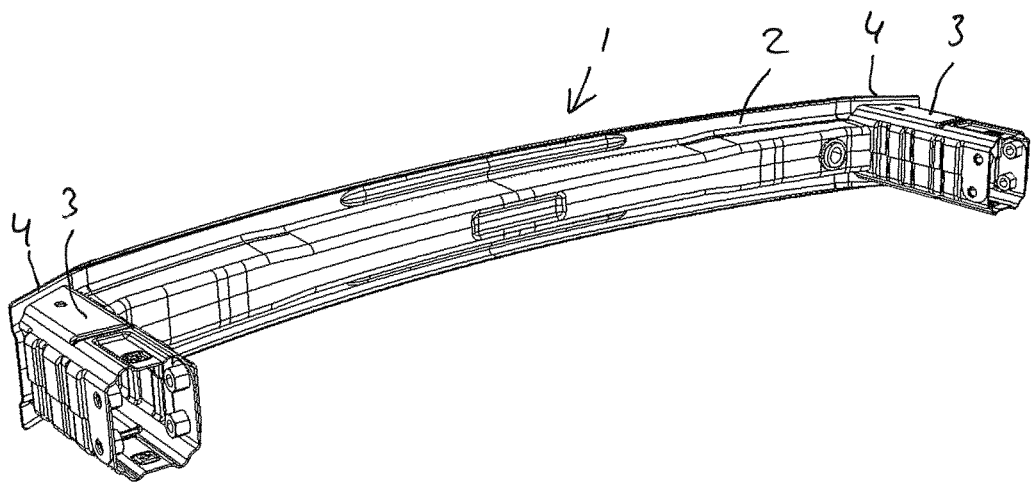
FIG. 2 is a perspective view obliquely from behind of the bumper shown in FIG. 1.

FIGS. 1 and 2 show a bumper 1 comprising a cross member 2 and a longitudinal horizontally extending crash box 3 according to the invention attached, preferably by welding, to respective end 4 thereof. The cross member 2 is preferably hat-shaped, and the forward end of respective crash box 3 is formed with two protruding tongues 5 (see FIGS. 3 and 4) arranged to straddle the rear side of the U-shaped portion 6 of the hat-shaped cross member 2 and are attached thereto preferably by welding.

Figure 3:
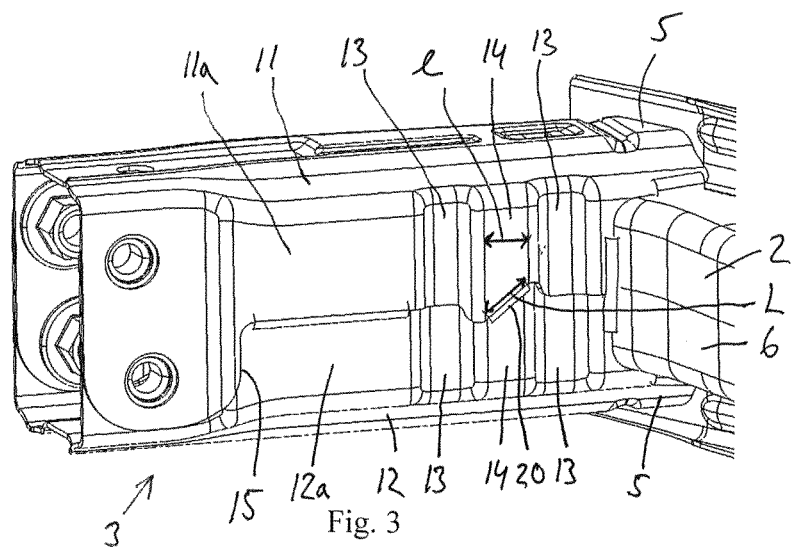
FIG. 3 is a perspective view obliquely from behind of a first embodiment of an inventive crash box attached to the cross member of which only a miner portion is shown and having an intermediate portion with a schematically shown inclined straight weld bead.
Figure 4:
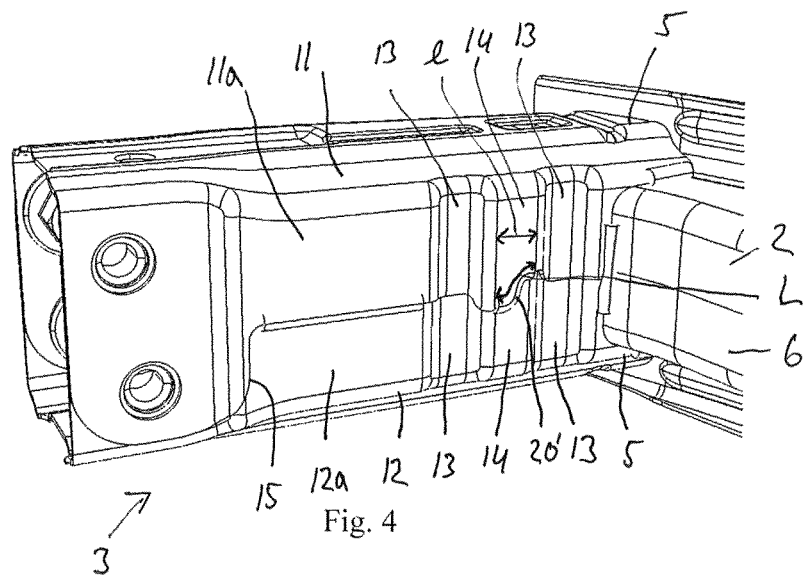
FIG. 4 is perspective view obliquely from behind of second embodiment of the inventive crash box attached to the cross member of which only a miner portion is shown and having an intermediate portion with a schematically shown S-shaped weld bead.
Figure 5:
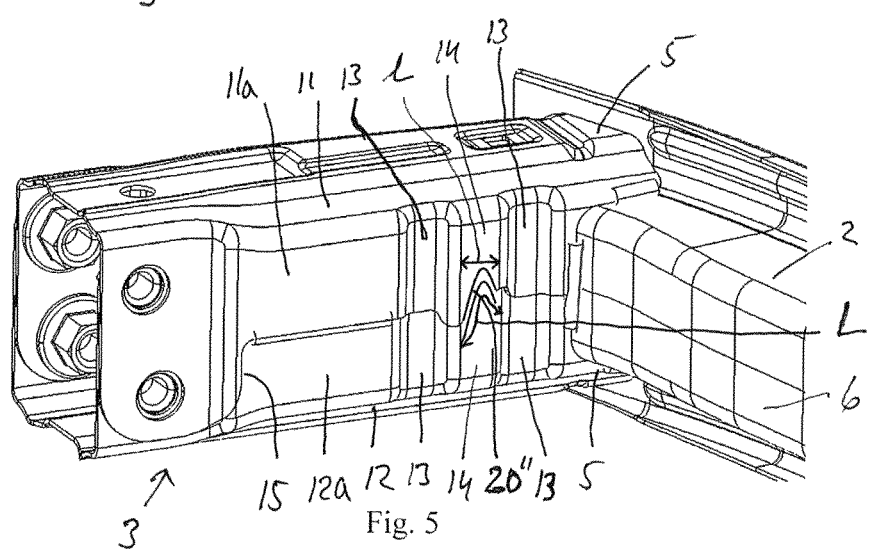
FIG. 5 is perspective view obliquely from behind of third embodiment of the inventive crash box attached to the cross member of which only a miner portion is shown and having an intermediate portion with a schematically shown bow-shaped weld bead.

As seen in FIGS. 3 to 5, the crash box 3 comprises two generally U-shaped members, one upper member 11 and one lower member 12, provided at respective leg 11a, 12a with at least two adjacent preferably aligned trigger means 13. The upper and lower members 11, 12 are welded together at areas along a trim edge 15 of respective leg 11a, 12a of the U-shaped members 11, 12 so as to form a longitudinal extending generally hollow crash box 3 having a cross-section in the form of a quadrangle. To control and improve the buckling behavior of the crash box at least two trigger means 13 are arranged normal to said longitudinal extending crash box 3. An intermediate portion 14 of respective upper and lower member 11, 12 is formed between said at least two adjacent trigger means 13, and the upper and lower members 11, 12 of the intermediate portion 14 are welded together by a weld bead 20 at the trim edges thereof.

It should be noted that the trim edge 15 of the upper and lower U-shaped members 11, 12 of the respective trigger means 13 are not welded together, i.e. the upper and lower U-shaped members 11, 12 are welded together at areas along the trim edge 15 of respective legs of respective U-shaped members except for the trim edge formed between respective legs 11*a*, 12*a* of respective trigger means 13.

FIG. 3 shows an embodiment in which the weld bead 20 is formed as a linear, preferably straight, weld bead having an angle of inclination to a horizontal plane of between 20° to 70°, preferably between 30° to 60°, more preferably between 40° and 50°.

FIG. 4 shows another embodiment in which said weld bead 20' has the shape of a horizontal or inclined S. In FIG. 4 the weld bead 20' is shown having a general horizontal S-shape.

FIG. 5 shows a further embodiment in which the weld bead 20" has the shape of a curve/bow. The curve may be formed with either its apex pointing upwards or its apex pointing downwards. In FIG. 5 it is shown with its apex pointing upwards.

Thus, as can be inferred from the above the weld bead 20; 20'; 20" is linear or non-linear.

As can be inferred from the above, for increasing the strength and to achieve a more optimal loading on the weld bead 20; 20'; 20" connecting the upper and lower members 11, 12 of respective intermediate portion 14, in the event of a crash, said weld bead 20; 20'; 20" is formed with/has a length L which is longer that the shortest length 1 between two adjacent trigger means 13.

It should be note that the inventive crash box is provided on the opposite side (the side not shown in FIGS. 3 to 5) with corresponding trigger means 13 and intermediate welded portion 20; 20'; 20". Thus, the inside (directed towards the center of the cross member) and the outside of the crash box 3 are preferably symmetrically shaped.

The invention claimed is:

1. A crash box comprising two generally U-shaped members, one upper and one lower member, having legs and provided at each respective leg with at least two adjacent trigger means and an intermediate portion formed between said trigger means, said upper and lower members being welded together at areas along a trim edge of the respective legs of the U-shaped members except for the trim edge formed between respective legs of respective trigger means so as to form a generally hollow crash box extending in a longitudinal direction, said crash box having a cross-section in the form of a quadrangle and having aligned trigger means and an intermediate portion, said trigger means being arranged normal to said longitudinal direction, wherein the intermediate portion of the respective leg is welded together at the trim edge thereof by a weld bead, wherein said weld bead extends between said aligned trigger means at least partly at an angle relative to said longitudinal direction, such that said weld beam has a length which is longer than the shortest length between two adjacent trigger means.

2. The crash box according to claim 1, wherein the weld bead is linear or non-linear.

3. The crash box according to claim 2, wherein said weld bead is a linear weld bead having an angle of inclination relative to the longitudinal direction of between 20° to 70°.

4. The crash box according to claim 2, wherein said weld bead has the shape of a horizontal or inclined S.

5. The crash box according to claim 2, wherein said weld bead has the shape of a curve.

6. Method for producing a crash box comprising two generally U-shaped members, one upper and one lower member, having legs and provided at each respective leg with at least two adjacent trigger means and an intermediate portion formed between said trigger means, said upper and lower members being welded together at areas along a trim edge of the respective legs of the U-shaped members except for the trim edge formed between respective legs of respective trigger means so as to form a generally hollow crash box extending in a longitudinal direction, said crash box having a cross-section in the form of a quadrangle and having aligned trigger means and an intermediate portion, said trigger means being arranged normal to said longitudinal direction, wherein the intermediate portion of respective leg is welded together at the trim edge thereof by a weld bead, wherein said weld bead extends between said aligned trigger means at least partly at an angle relative to said longitudinal direction, such that said weld beam is formed with a length which is longer than the shortest length between two adjacent trigger means.

* * * * *